(12) United States Patent
Donovan

(10) Patent No.: US 12,291,854 B2
(45) Date of Patent: May 6, 2025

(54) INTEGRATED WATER SHUT OFF VALVE CONTROL SYSTEM

(71) Applicant: STATE FARM MUTUAL AUTOMOBILE INSURANCE COMPANY, Bloomington, IL (US)

(72) Inventor: John R. Donovan, Bloomington, IL (US)

(73) Assignee: STATE FARM MUTUAL AUTOMOBILE INSURANCE COMPANY, Bloomington, IL (US)

( * ) Notice: Subject to any disclaimer, the term of this patent is extended or adjusted under 35 U.S.C. 154(b) by 114 days.

(21) Appl. No.: 18/183,620

(22) Filed: Mar. 14, 2023

(65) Prior Publication Data

US 2024/0287771 A1    Aug. 29, 2024

Related U.S. Application Data

(60) Provisional application No. 63/486,565, filed on Feb. 23, 2023.

(51) Int. Cl.
*E03B 7/07* (2006.01)
*G01M 3/28* (2006.01)

(52) U.S. Cl.
CPC .......... *E03B 7/071* (2013.01); *G01M 3/2807* (2013.01)

(58) Field of Classification Search
CPC .............................. E03B 7/071; G01M 3/2807
See application file for complete search history.

(56) References Cited

U.S. PATENT DOCUMENTS

| | | | | |
|---|---|---|---|---|
| 5,409,037 A * | 4/1995 | Wheeler | ............... | G01M 3/243 137/551 |
| 6,662,821 B2 * | 12/2003 | Jacobsen | ................. | F16K 31/05 700/282 |
| 9,458,608 B1 * | 10/2016 | Chevalier | ............... | E03B 7/071 |
| 9,759,345 B2 * | 9/2017 | Savla | ...................... | G01M 3/18 |
| 9,759,632 B2 * | 9/2017 | Trescott | ................. | G01K 13/02 |
| 10,161,115 B2 * | 12/2018 | Beger | .................... | F16K 31/055 |
| 11,105,705 B1 | 8/2021 | Lowitz et al. | | |
| 2007/0289635 A1 * | 12/2007 | Ghazarian | ............... | G01M 3/18 137/312 |
| 2011/0114202 A1 * | 5/2011 | Goseco | ..................... | E03B 7/04 137/487.5 |
| 2018/0003411 A1 * | 1/2018 | Taylor | ..................... | B23P 19/00 |
| 2019/0136492 A1 * | 5/2019 | Trescott | .................... | G01F 1/69 |

* cited by examiner

*Primary Examiner* — Umashankar Venkatesan
(74) *Attorney, Agent, or Firm* — MARSHALL, GERSTEIN & BORUN LLP

(57) ABSTRACT

Systems and methods are provided for automatically actuating preexisting water shut-off valves upon detection of leak conditions. A coupling of a valve actuator is connected to a handle of the valve, such that a motor of the valve actuator causes the selective opening and closing of the valve. A controller obtains water flow data from a non-intrusive flow sensor (e.g., an ultrasonic sensor) clamped onto a pipe attached to the valve in close proximity thereto, as well as obtaining additional sensor data from remote sensors disposed elsewhere in the water supply system (e.g., pressure levels measured by an in-line pressure sensor). When the controller determines a leak condition exists based upon the water flow data and the additional sensor data, it controls the actuator to close the valve. The controller may also test for leaks by periodically shutting the valve and measuring the pressure while the valve is shut.

20 Claims, 6 Drawing Sheets

INTEGRATED WATER SHUT OFF VALVE CONTROL SYSTEM

CROSS-REFERENCE TO RELATED APPLICATIONS

This application claims the benefit of U.S. Provisional Application No. 63/486,565, filed Feb. 23, 2023, the entirety of which is incorporated by reference herein.

TECHNICAL FIELD

The present disclosure generally relates to systems and methods for detecting leaks in a water supply system and automatically shutting off a water supply to the water supply system when leaks are detected. More particularly, the present disclosure relates to systems and methods for performing such leak monitoring and automatic shut-off using a valve actuator attached to an existing water shut-off valve without disrupting the water supply system.

BACKGROUND

Both large and small leaks in water supply systems within buildings may cause significant damage. Much of the damage may be prevented by actuating a water shut-off valve to disconnect the water supply system within a building, or a portion of the building, from a larger water supply.

Because leaks may be difficult to detect until noticeable damage has already occurred, systems have been developed to automatically detect leaks and disconnect the flow of water into water supply systems. Such automatic shut-off systems may either (i) require in-line installation that replaces part of the water supply system with the automatic shut-off system including an integrated water shut-off valve, or (ii) work with existing water shut-off valves by attaching to their handles, but may provide only rudimentary leak detection through water presence sensors covering a limited portion of the water supply system.

Thus, each type of existing automatic shut-off system may have its advantages and disadvantages. The in-line systems may be more accurate but may require disconnecting the water supply system in order to use specialized tools to install the systems in-line with the flow of water through the pipes of the water supply system. The attachable systems may be connected to existing water shut-off valves to avoid interruption to the water supply system, but they may be less accurate and offer only limited leak detection due to limited sensor data to detect leaks. Conventional techniques may include other ineffectiveness, inefficiencies, encumbrances, and drawbacks as well.

SUMMARY

The systems, methods, and computer-readable instructions disclosed herein may, inter alia, solve the problems of existing automatic shut-off systems associated with automatically monitoring water supply systems and actuating water shut-off valves to prevent damage from leaks. As described herein, a system for actuating a water shut-off valve attached to a pipe of a water supply system is provided.

According to one aspect, the system may include: (i) a valve actuator comprising a motor and a valve handle coupling configured to apply a torque to a handle of the water shut-off valve to selectively open or close the water shut-off valve to control flow of water through the pipe; (ii) a non-intrusive flow sensor configured to sense water flow within the pipe when attached to an external surface of the pipe; (iii) a communication interface configured to send and receive electronic communication via one or more wireless communication protocols; and/or (iv) a controller communicatively connected to the valve actuator, the non-intrusive flow sensor, and the communication interface, wherein the controller is configured to execute instructions to: (a) obtain water flow data indicating a level of water flow through the pipe from the non-intrusive flow sensor; (b) obtain additional sensor data from one or more remote sensors disposed at one or more additional pipes within the water supply system via the communication interface; (c) determine whether a leak condition is detected within the water supply system based upon the water flow data and the additional sensor data; and/or (d) when the leak condition is detected, control the valve actuator to close the water shut-off valve. The system may include additional, less, or alternate functionality, including that discussed elsewhere herein.

For instance, the water shut-off valve may comprise a ball valve or a gate valve, such that the handle respectively comprises a lever or a handwheel. In some embodiments, the communication interface is configured to communicate with a smart home hub, such that the controller may send notifications to the smart home hub in order to cause the smart home hub to present an alert to a user via a user computing device, such as when a leak condition is detected or a water system test is failed.

In some embodiments, the non-intrusive flow sensor may be an ultrasonic flow sensor configured to be clamped onto the pipe. The non-intrusive flow sensor may be disposed in proximity to the water shut-off valve and is communicatively connected to the controller via a wired connection. Additionally or alternatively, the system may further comprise an actuator clamp attached to the valve actuator and be configured to hold the actuator in position relative to the shut-off valve, such that the actuator clamp is configured to fasten around the pipe in proximity to the shut-off valve, and the non-intrusive flow sensor may be attached to or integrated into the actuator clamp.

In further embodiments, the one or more remote sensors include one or more in-line pressure sensors, which may be connected to an additional pipe of the water supply system and which generate additional sensor data including a pressure level measured by the in-line pressure sensor. Determining whether the leak condition is detected may thus include determining whether the pressure level is below a pressure threshold.

In some embodiments, the controller may be further configured to execute instructions to perform a water system test of the water supply system. Such water system test may include: (i) periodically controlling the valve actuator to close the water shut-off valve at times when the level of water flow through the pipe is below a testing threshold, (ii) obtaining the pressure level from the in-line pressure sensor while the water shut-off valve is closed, (iii) determining whether the pressure level exceeds a pressure threshold, and/or (iv) controlling the valve actuator to reopen the water shut-off valve based upon the pressure level exceeding the pressure threshold.

In some such embodiments, the water system test may further include determining whether the pressure level exceeds a leak risk pressure that is greater than the pressure threshold and, when the pressure level does not exceed the leak risk pressure, sending a notification via the communication interface to cause an alert to be presented to a user via a user computing device. Additionally or alternatively, the one or more remote sensors may include one or more water presence sensors disposed below the one or more additional pipes to detect leaks based upon water presence outside the one or more additional pipes.

In yet further embodiments, the system may further comprise a battery backup connected to the valve actuator via a power cable and a temperature sensor communicatively connected to the controller. In some such embodiments, the controller may further be configured to detect when a power supply from a primary power source has been disrupted. When such disruption is detected, the controller may use the battery backup to determine whether a temperature indicated by the temperature sensor is below a freeze risk threshold and, when the temperature is below the freeze risk threshold, control the valve actuator to close the water shut-off valve.

Methods or computer-readable media storing instructions for implementing all or part of the actions of the system described above may also be provided in some aspects. Such methods or computer-readable media may include implementing executable instructions to cause one or more processors to control the system described above to perform part or all of the actions described above. Additional or alternative features described herein below may be included in some aspects.

BRIEF DESCRIPTION OF THE DRAWINGS

The Figures described below depict various aspects of the system and methods disclosed therein. It should be understood that each Figure depicts an embodiment of a particular aspect of the disclosed system and methods, and that each of the Figures is intended to accord with a possible embodiment thereof. Further, wherever possible, the following description refers to the reference numerals included in the following Figures, in which features depicted in multiple Figures are designated with consistent reference numerals.

DETAILED DESCRIPTION

The systems, methods, and computer-readable instructions disclosed herein may, inter alia, solve certain problems associated with automatically monitoring water supply systems and actuating water shut-off valves to prevent damage from leaks. While existing automatic shut-off systems provide either accurate leak detection or non-intrusive installation, the systems and methods disclosed herein provide both advantages. By using non-intrusive water flow sensors and communication with remote sensors, the automatic water shut-off systems and methods disclosed herein may provide accurate detection and testing of water supply systems without requiring intrusive in-line installation at or near a water shut-off valve, thereby enabling installation of the disclosed systems in existing water supply systems.

While some embodiments described herein include in-line water pressure sensors installed at locations within the water supply system that are remote from the water shut-off valve, such in-line sensors may be easily installed at supply connections of faucets or other water appliances, such as between a threaded connector and a supply hose that is easily disconnected and connected without the use of specialized tools (e.g., at a supply line under a sink or at a washer unit). Thus, the disclosed automatic shut-off systems may be configured for improved installation by end users by avoiding the need for costly and time-consuming replacement of part of water supply systems to install an in-line automatic water shut-off valve in an existing water supply system.

Exemplary Water Supply System

Figure 1:
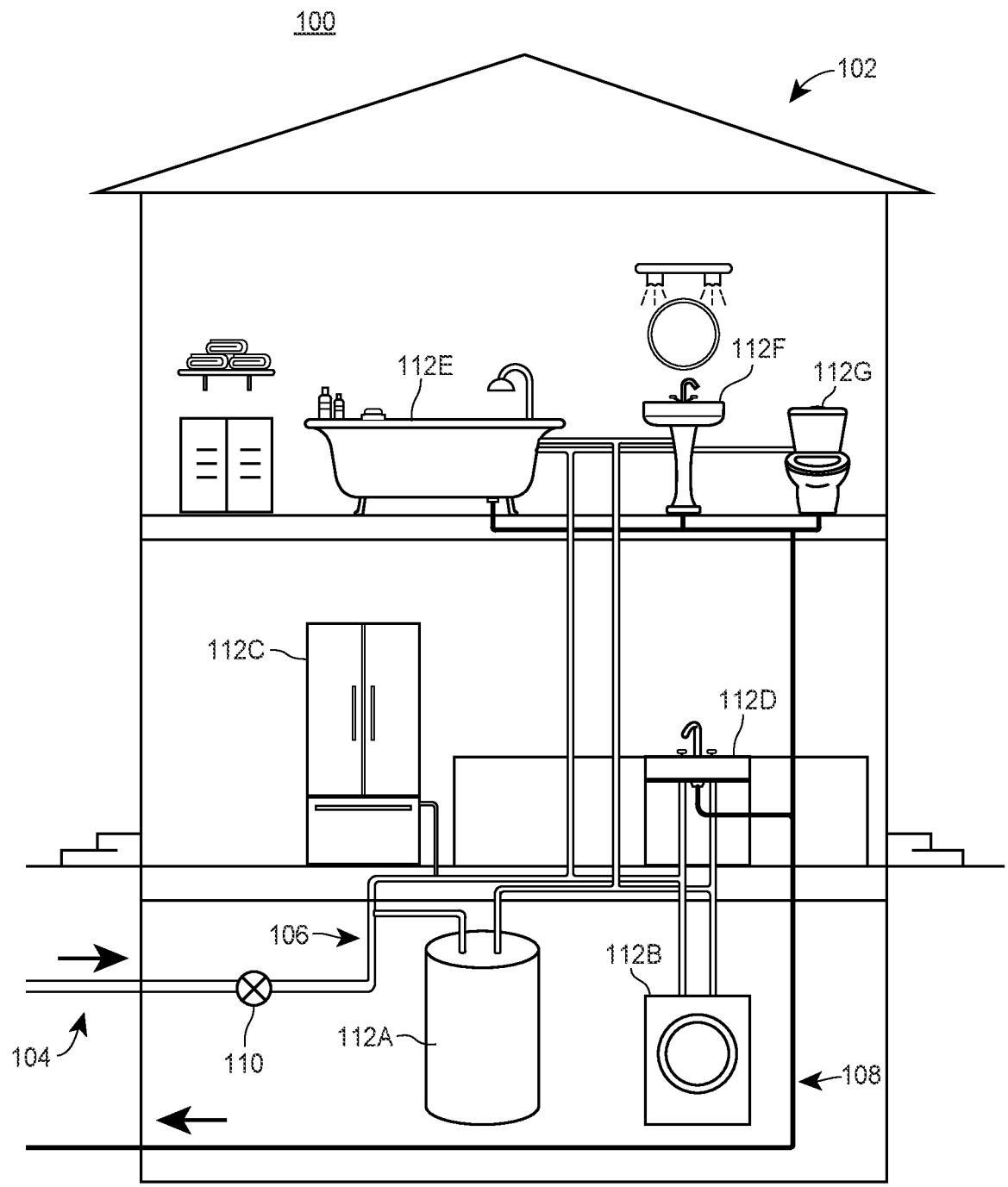
FIG. 1 illustrates an exemplary water supply system of a building, in which various embodiments of the present disclosure may be implemented.

FIG. 1 illustrates an exemplary water supply system 100 of a building 102, in which various embodiments of the present disclosure may be implemented. The water supply system 100 comprises a plurality of pipes forming a network supplied by a water supply 104 (e.g., a supply of water into the building 102 from a municipal water system) and supplying a wastewater drain 108 (e.g., a drain for wastewater out of the building 102 to a municipal sewage system).

The input from the water supply 104 may be controlled by a water shut-off valve 110 at or near a connection to the water supply 104. The water shut-off valve 110 enables an operator to disconnect the water supply 104 from the internal water supply system 106 of the building 102 by closing the water shut-off valve 110. The water shut-off valve 110 may be therefore disposed in-line between pipes of the water supply 104 and the internal water supply system 106. As illustrated, the water shut-off valve 110 may often be installed in a basement or other location that is difficult to access and may be cramped, thereby limiting accessibility for an operator to access the water shut-off valve 110 or limiting space for an automatic valve actuator to be installed.

The internal water supply system 106 supplies water received from the water supply 104 through the water shut-off valve 110 to various water appliances and outlets within the building 102 via a network of pipes. For example, the internal water supply system 106 may supply a water heater 112A, a washer 112B, a refrigerator 112C, a kitchen sink 112D, a bathtub 112E, a bathroom sink 112F, and a toilet 112G. As illustrated, the water heater 112A may additionally supply hot water to other components of the internal water supply system 106, while various other components may provide wastewater to the wastewater drain 108.

Exemplary Cross-Section View

Figure 2A:
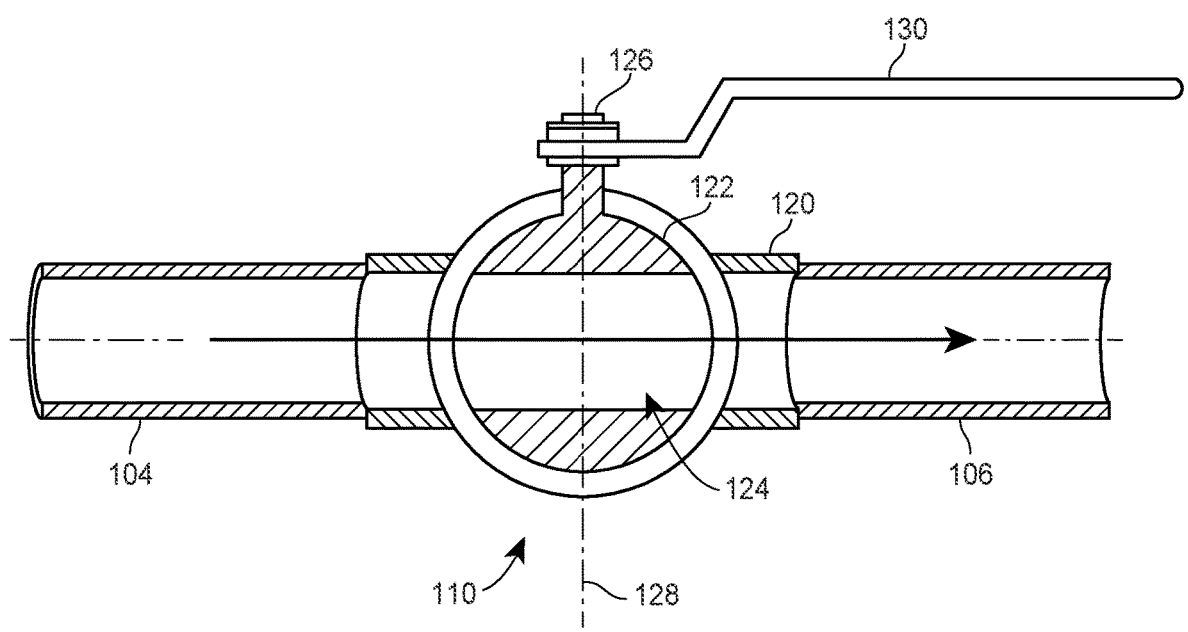
FIG. 2A illustrates a cross-section view of an exemplary water shut-off valve for controlling water flow of a water supply system, such as that illustrated in FIG. 1.

FIG. 2A illustrates an exemplary cross-section view of a water shut-off valve 110 for controlling water flow of a water supply system, such as the water supply system 100 illustrated in FIG. 1. The water shut-off valve 110 may be disposed between an input pipe supplying water from the water supply 104 and an output pipe of the internal water supply system 106 to control the flow of water through the pipes.

As illustrated, the water shut-off valve 110 comprises a ball 122 within a housing 120, through which a stem 126 of the ball 122 protrudes. The stem 126 may be connected to a handle 130 comprising a lever, such that when the handle 130 is rotated with respect to a rotational axis 128 of the valve, the stem 126 and ball 122 rotate around the rotational axis 128 to open or close the valve. Such rotation opens or closes the water shut-off valve 110 by aligning a channel 124 within the ball 122 to either permit or block water flow through the valve. Thus, actuating the water shut-off valve 110 by applying a torque to the handle 130 either opens or closes the water shut-off valve 110 by transferring the torque through the stem 126 to the ball 122 within the housing 120 to align the channel 124 in either an open or closed position relative to the pipes.

Although illustrated as a ball valve, the water shut-off valve 110 may be any type of valve. For example, the water shut-off valve 110 may be a gate valve, in which case the handle 130 may be a handwheel to which a torque may be applied, such that multiple turns of the handwheel will fully open or close the valve. In such embodiments, however, water shut-off valve 110 nonetheless includes a handle 130 comprising a movable (e.g., rotatable) portion that may be moved by hand or by a valve actuator to open or close the water shut-off valve 110.

Exemplary Perspective View

Figure 2B:
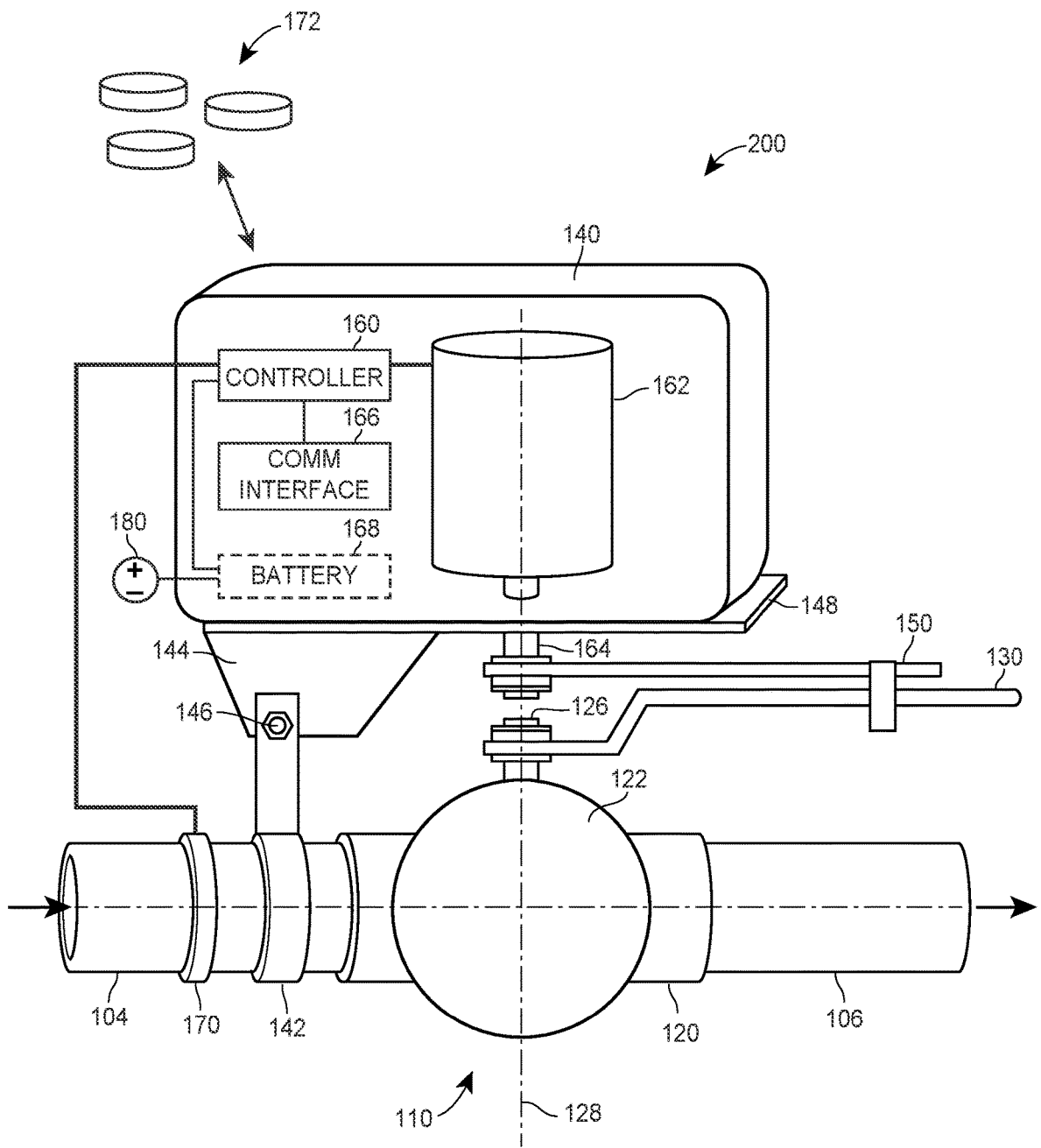
FIG. 2B illustrates a perspective view of an automatic shut-off system attached to the water shut-off valve to control opening and closing the water shut-off valve in accordance with various embodiments described herein.

FIG. 2B illustrates an exemplary perspective view of an automatic shut-off system 200 attached to the water shut-off valve 110 to control opening and closing the water shut-off valve 110 in accordance with various embodiments described herein. The automatic shut-off system 200 comprises (i) a valve actuator 140 connected to the handle 130 of the water shut-off valve 110 via a valve handle coupling 150, (ii) an actuator clamp 142 configured to clamp to a pipe in proximity to the water shut-off valve 110 in order to hold the valve actuator 140 in place relative to the water shut-off valve 110, and (iii) one or more sensors, which may include one or more non-intrusive sensors 170 disposed at or near the water shut-off valve 110 and/or one or more remote sensors 172 disposed at or near other parts of the internal water supply system 106. In some embodiments, the valve actuator 140 may be connected to the actuator clamp 142 via a baseplate 148, which may have an adjustable portion 144 that is removably attached to the actuator clamp 142 via a bolt 146 in order to facilitate alignment of the rotor 164 of the motor 162 with the rotational axis 128 of the water shut-off valve 110.

The valve actuator 140 comprises a controller 160 configured to control operation of the automatic shut-off system 200 by controlling operation of a motor 162, the rotor 164 of which is connected to the valve handle coupling 150. To determine control operations for the motor 162, the controller 160 implements control logic to obtain and analyze sensor data from one or more sensors, such as non-intrusive sensors 170 or remote sensors 172. Such sensors may be communicatively connected to the controller 160 via wired connections or wireless connections, and the valve actuator 140 may further comprise a communication interface 166 configured to send and receive electronic communications with the sensors via one or more wireless communication protocols to obtain the sensor data. The controller 160 controls operation of the motor 162 in order to actuate the water shut-off valve 110 by applying a torque to the valve handle 130 via the valve handle coupling 150.

The valve handle coupling 150 may be connected to the rotor 164 of motor 162, such that the rotation of the rotor 164 causes the valve handle coupling 150 to rotate with respect to the stationary water shut-off valve 110, connected pipes, and fixed body of the valve actuator 140. The valve handle coupling 150 may be configured to fit over the valve handle 130 in order to apply a torque to the valve handle 130, thereby enabling the valve actuator 140 to be installed over an existing water shut-off valve 110 to control opening and closing the water shut-off valve 110 without requiring modification or replacement of the water shut-off valve 110. The valve handle coupling 150 may comprise a rigid member extending from a first end at which it is coupled to the rotor 164 to a second end at which it is coupled to the valve handle 130. Thus, rotation of the rotor 164 causes the valve handle coupling 150 to apply a force to rotate the valve handle 130.

As illustrated, in some embodiments, the valve handle 130 and the valve handle coupling 150 rotate about the rotational axis 128, with the motor 162 being aligned such that its rotor 164 likewise rotates about the same rotational axis 128. By controlling the motor 162 to apply a torque to the valve handle 130 via the valve handle coupling 150, the controller 160 of the valve actuator 140 may thus be able to cause the water shut-off valve 110 to open or close in order to control flow of water through the water shut-off valve 110 and connected pipes. Thereby, the controller 160 may be configured to selectively control the water supply to the internal water supply system 106.

The valve actuator 140 and its components may be powered by electricity received from a power source 180 (e.g., an electric power system of the building 102, which may receive power from an electric power utility). In some embodiments, the valve actuator 140 includes or is connected to a battery 168, which stores power received from the power source 180. The battery 168 may thus serve as a secondary power source to operate the valve actuator 140 when primary power from the power source 180 is interrupted. In further embodiments, the battery 168 may be separate from the valve actuator 140 and connected via a power cable to the valve actuator 140 in order to reduce the size of the valve actuator 140. Thus, the battery 168 may be disposed near but separate from the valve actuator 140 to save space, which may be beneficial in tight spaces.

Similarly, in further embodiments, the controller 160 may be separated from the valve actuator 140 and connected thereto by a wired connection. In some such embodiments, the controller 160 and battery 168 may be combined into a separate component of the automatic shut-off system 200 and connected to the valve actuator 140 via one or more wired connections.

Additionally or alternatively, the valve actuator 140 and its components may be powered by devices that generate (and store) electricity or power from vibration, such as MEMS (micro-electro-mechanical systems) or piezoelectric devices. Other sources of power may be temperature gradient or solar based.

The valve actuator 140 further may include or be connected to one or more non-intrusive sensors 170 to measure water flow through the water shut-off valve 110 or through the pipes near the water shut-off valve 110, which water flow data may be used by the controller 160 to monitor for leaks and control operation of the valve actuator 140. The non-intrusive sensor 170 may be configured to measure the water flow when attached to an external surface of a pipe, such as by being clamped onto a pipe attached to the water shut-off valve 110.

In some embodiments, the non-intrusive sensor 170 comprises an ultrasonic flow sensor that measures water flow through the attached pipe by detecting changes in conduction of ultrasonic signals through the pipe between transducers disposed at locations on the exterior surfaces of the pipe, which changes are indicative of a flow rate of water through the pipe. In addition to being in proximity to the valve actuator 140, disposing the non-intrusive sensor 170 in proximity to the water shut-off valve 110 improves the accuracy of the measurements in many instances because the pipe segments to which the water shut-off valve 110 are attached are often made of copper and have superior conductivity for non-intrusive water flow measurement.

In some embodiments, therefore, the non-intrusive flow sensor is a separate component disposed in proximity to the water shut-off valve 110 and communicatively connected to the controller 160 via a wired connection. In further embodiments, non-intrusive flow sensor 170 is attached to or integrated into an actuator clamp 142 that holds the valve actuator 140 in place with respect to the water shut-off valve 110.

The automatic shut-off system 200 may include or communicate with remote sensors 172 via wired or wireless electronic communication to obtain additional sensor data, which may be further used by the controller 160 to monitor for leaks and control operation of the valve actuator 140. The communication interface 166 may thus communicate with the one or more remote sensors 172 to provide additional sensor data from the remote sensors 172 to the controller 160. Such communication between the communication interface 166 and the one or more remote sensors 172 may occur by transmitting and receiving wireless communication messages or signals using one or more wireless communication protocols. The communication interface 166 may thereby communicate wirelessly either directly with the remote sensors 172 or via an intermediary device, such as a smart home system hub. In various embodiments, the remote sensors 172 may be special purpose sensors installed within the building 102, or the remote sensors 172 may be integrated within smart home devices (e.g., network-connected washers, refrigerators, or water heaters).

In some embodiments, the remote sensors 172 may include one or more in-line pressure sensors connected to pipes within the internal water supply system 106 to provide water pressure data at corresponding locations within the internal water supply system 106. Each such in-line pressure sensor may be configured to measure water pressure levels at its installed location and transmit water pressure data to a remote processing device, such as a smart home system hub or the controller 160. For example, such in-line pressure sensors may be installed at connections of any of the various water appliances and outlets within the building 102 (e.g., at a supply line of a washer 112B, a refrigerator 112C, a kitchen sink 112D, a bathroom sink 112F, or a toilet 112G). Because the water supply line connections of such appliances and outlets are designed to be connected and disconnected without specialized tools or significant expertise, installing in-line pressure sensors at such locations reduces the time and skill required to install the automatic shut-off system 200 in an existing internal water supply system 106.

In further embodiments, the remote sensors 172 may additionally or alternatively include one or more water presence sensors disposed below or near pipes of the internal water supply system 106 to detect the presence of water outside the pipes. Such water presence sensors may be disposed in locations where pipes or other components may be more likely to leak (e.g., such as at joints or connections) or where water from a leak is most likely to drip from a low point of a pipe in order to detect leaks based upon the presence of water (e.g., water dripping from pipes). For energy efficiency, the water presence sensors may be configured to transmit signals only upon detecting the presence of water in some embodiments.

In yet further embodiments, the remote sensors 172 may include one or more temperature sensors, which may be disposed at any location within the building 102. In various embodiments, one or more temperature sensors may be incorporated within or connected to the valve actuator 140 or may be disposed within a smart thermostat within the building 102.

Exemplary Control System

Figure 3:
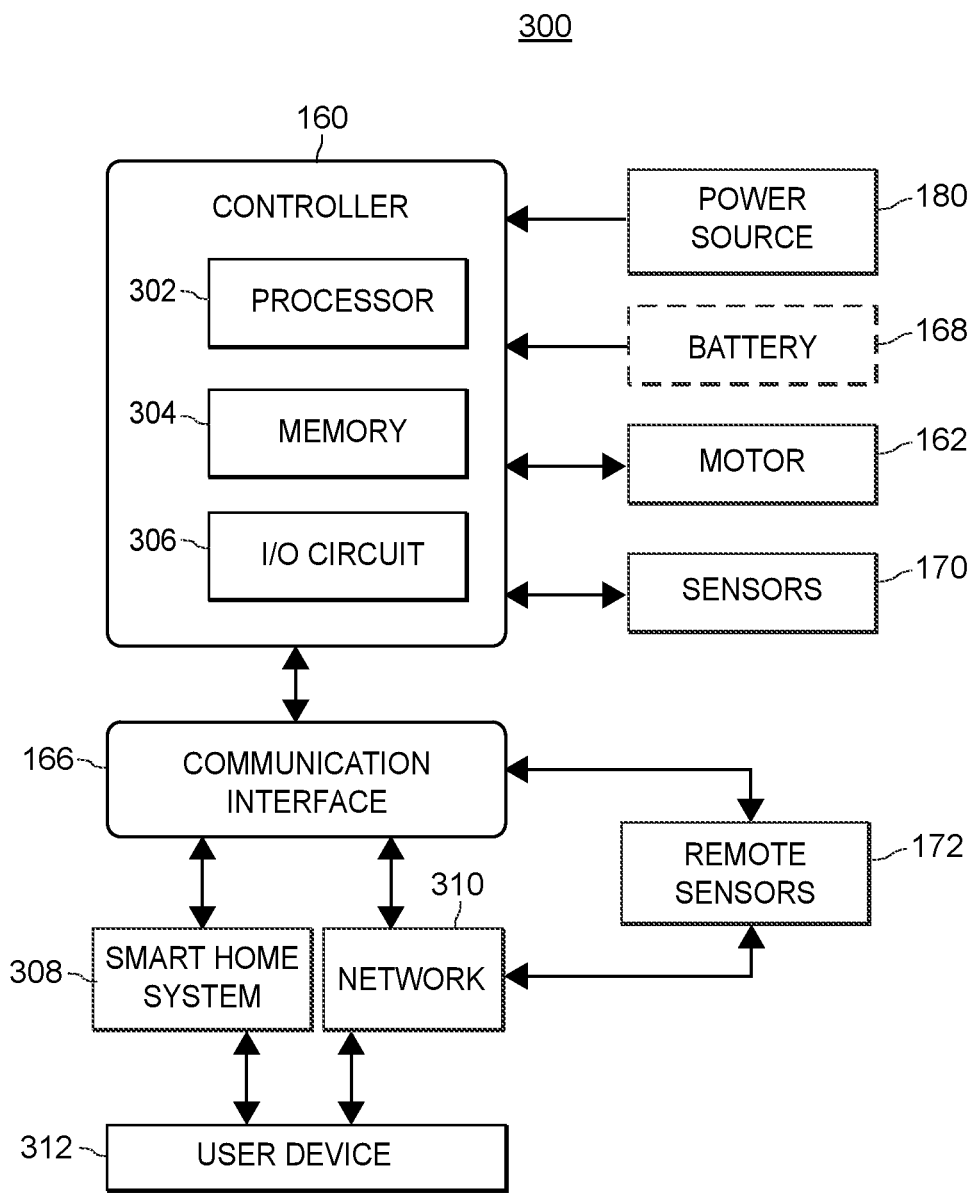
FIG. 3 illustrates a block diagram of an exemplary control system comprising electrical and communication components of the automatic shut-off system and related devices.

FIG. 3 illustrates a block diagram of an exemplary control system 300 comprising electrical and communication components of the automatic shut-off system 200 and related devices. The control system may include a controller 160, a power source 180, a battery 168, a motor 162, one or more sensors 170, a communication interface 166, and the following components communicating with the controller 160 through the communication interface 166: one or more remote sensors 172, a smart home system 308, a network 310, and a user device 312. Additional, alternative, or fewer components may be included in various alternative embodiments.

The controller 160 may be configured to obtain and analyze data from various other components in order to control opening and closing of the water shut-off valve 110. The controller 160 comprises one or more processors 302, one or more memories 304, and one or more input/output (I/O) circuits 306. The one or more processors 302 may be microprocessors adapted and configured to execute one or more software applications defined by instructions stored in the one or more memories 304. The one or more memories 304 may include volatile memory (e.g., random access memory) and non-volatile memory (e.g., program memory or data storage, such as semiconductor memories, magnetically readable memories, or optically readable memories), which may store software applications and data for analysis according to the various embodiments described herein.

The one or more I/O circuits 306 handle input and output between the controller 160 and other components, such as the communication interface 166, sensors 170 or 172, and motor 162. The power source 180 and the battery 168 may provide power to the controller 160, which may in turn control the provision of power the motor 162.

The communication interface 166 serves to connect the controller 160 to various communication devices in the controller system 300, such as to remote sensors 172, a hub of a smart home system 308, a communication network 310, or a user device 312. To accomplish this, the communication interface 166 may comprise one or more transceivers to transmit and receive wireless communications with external devices, either directly or via a network using any suitable wireless communication protocol, such as wireless telephony (e.g., GSM, CDMA, LTE, etc.), Wi-Fi (e.g., 802.11 standards), WiMAX, Bluetooth, Z-Wave, Zigbee, LoRa, near field communication (e.g., ISO/IEC 18092), etc.

The communication interface 166 may be further configured to communicate with a smart home hub of a smart home system 308 to obtain additional sensor data from sensors or smart home devices or to communicate with a user device 312. The smart home system 308 may include various smart devices, such as smart thermostats, smart appliances (e.g., network-connected refrigerators, washers, or dryers), or user interface devices (e.g., displays or sound systems).

In some embodiments, the communication interface 166 may communicate with the remote sensors 172, a smart home system 308, or a user device 312 via a network 310, which network may comprise one or more nodes (e.g., routers, repeaters, modems, or gateways) connected by wireless or wired communication links, which may be static or dynamic. The communication interface 166 may be further configured to communicate with a user device 312 (e.g., a computer, smart phone, tablet, smart home display, or other fixed or mobile computing device) to receive control information from a user and/or to send notifications or alerts to a user (e.g., a homeowner of the building 102).

Exemplary Leak Detection & Water Shut-Off Method

Figure 4:
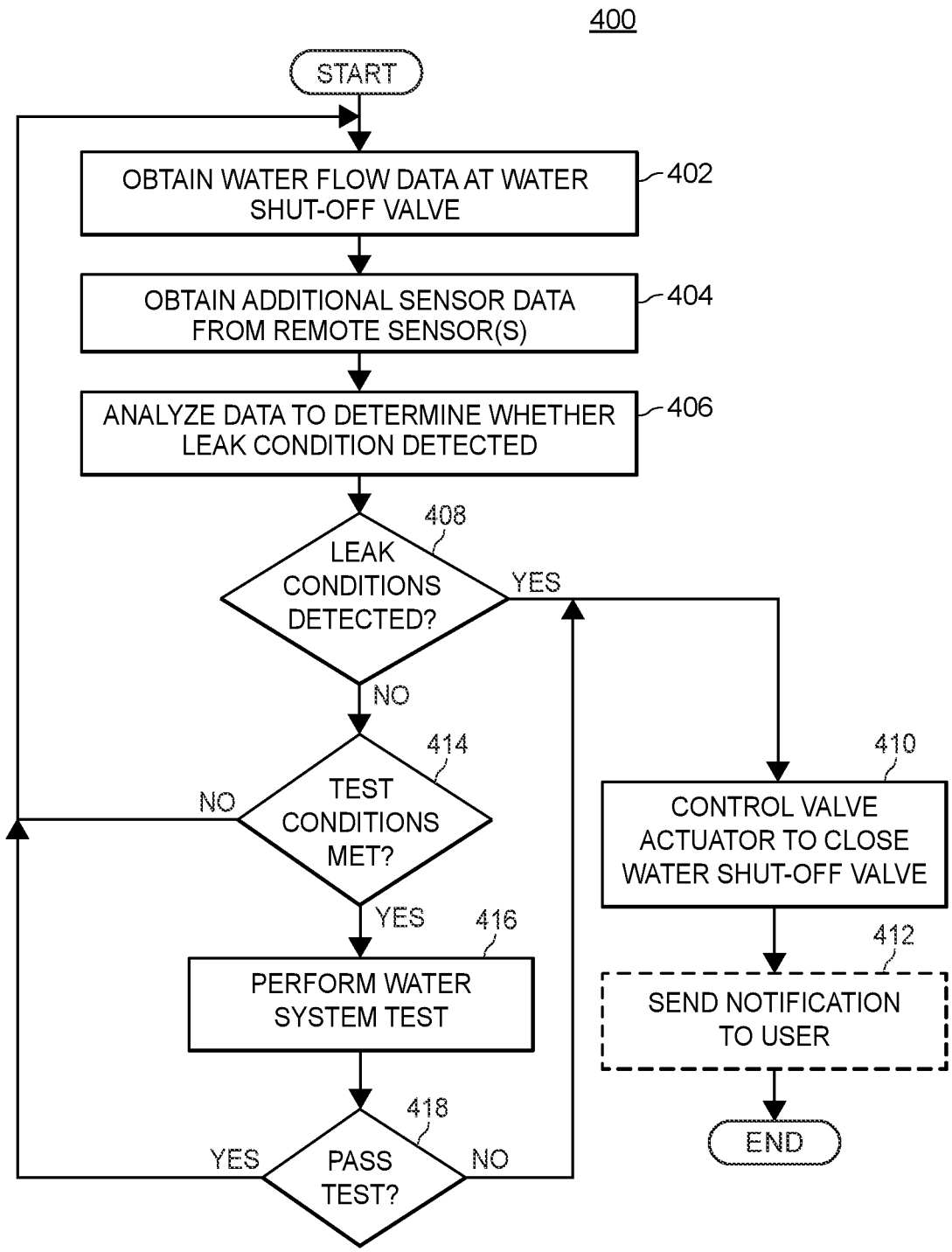
FIG. 4 illustrates a flow diagram of an exemplary leak detection and water shut-off method in accordance with various embodiments described herein.

FIG. 4 illustrates a flow diagram of an exemplary leak detection and water shut-off method 400 in accordance with various embodiments described herein. The method 400 may be performed by the various components of the automatic shut-off system 200 described above. Thus, one or more processors 302 of the controller 160 may be configured by executable instructions of one or more software applications stored in a memory 304 to monitor the internal water supply system 106 to detect leak conditions. The controller 160 may further perform periodic or occasional testing to determine a status of the internal water supply system 106 more generally, as discussed further with respect to FIG. 5 below. In some embodiments, the controller 160 may further communicate with a smart home system 308 or user device 312 to send and receive information relating to the internal water supply system 106.

The leak detection and water shut-off method 400 may begin with the controller 160 obtaining water flow data indicating a level of water flow at the water shut-off valve 110 (block 402) and obtaining additional sensor data from one or more remote sensors disposed at points along the internal water supply system 106 (block 404). The water flow data and additional sensor data is then analyzed to determine whether a leak condition is detected (block 406). When a leak condition is detected (block 408), the valve actuator 140 is controlled to close the water shut-off valve 110 (block 410) and, in some embodiments, a notification is sent to a user device 312 of a user (block 412). When no leak condition is detected (block 408), the controller 160 further determines whether to perform a test by determining whether test conditions are met (block 414). When the test conditions are determined to be met, a water system test is performed to test the operation of the internal water supply system 106 (block 416). When the water system test is failed (block 418), the valve actuator 140 is controlled to close the water shut-off valve 110 (block 410) and, in some embodiments, a notification is sent to a user device 312 of a user (block 412). When the test conditions are not met (block 414) or the water system test is passed (block 418), the controller 160 continues to monitor and test the internal water supply system 106 by obtaining new water flow data (block 402) and additional sensor data (block 404) for analysis. Additional, fewer, or alternative actions may be included in various embodiments.

At block 402, the controller 160 obtains water flow data indicating a level of water flow through the water shut-off valve 110. Such water flow data may be obtained from the non-intrusive sensor 170 placed on a pipe directly connected to the water shut-off valve 110, since the volume of water flowing through the water shut-off valve 110 equals the volume of water flowing through the pipes directly adjacent to the water shut-off valve 110. As discussed above, the non-intrusive sensor 170 may be configured to detect water flow through a pipe when attached to an external surface of the pipe, thereby providing an indication of a level of water flow via non-intrusive measurements (e.g., ultrasonic measurements through a pipe) without requiring an in-line sensor (i.e., a sensor placed between pipe segments, joints, valves, connectors, or otherwise disposed to be in contact with the water being measured). Such water flow data may be obtained from the non-intrusive sensor 170 via a wired or wireless connection, which may include a direct connection or an indirect connection through the communication interface 166.

At block 404, the controller 160 may obtain additional sensor data from one or more remote sensors 172 disposed at additional locations within or near the internal water supply system 106 via the communication interface 166. As discussed above, the remote sensors 172 may include in-line sensors, non-intrusive sensors, or other types of sensors. In some embodiments, the remote sensors 172 may include in-line pressure sensors connected to the internal water supply system 106 to provide pressure level measurements of the water at the locations at which they are installed (e.g., at faucet or appliance supply lines). Thus, the remote sensors 172 may provide water pressure data for the internal water supply system 106 at locations associated with various pipes without necessitating cutting or replacing any pipes.

In further embodiments, the remote sensors 172 may include water presence sensors disposed below or near pipes of the internal water supply system 106 to detect the presence of water outside the pipes, which may indicate a leak. In still further embodiments, the additional senso data may include temperature data from one or more temperature sensors, which may be remote or integrated into or connected to a housing of the valve actuator 140.

At block 406, the controller 160 analyzes the water flow data and the additional sensor data to determine whether a leak condition is detected for the internal water supply system 106. The analysis may include determining whether a sudden change in water flow has occurred that does not match a typical water flow profile associated with normal usage. For example, a sudden jump in the level of water flow may indicate a burst pipe somewhere within the internal water supply system 106. Additionally or alternatively, the analysis may include determining whether a pressure level measured by an in-line pressure sensor has dropped below a pressure threshold indicative of a lowest level of water pressure expected from normal use.

In some embodiments, the analysis may combine water flow data with additional sensor data to attempt to detect a leak condition. For example, a sudden jump in the level of water flow may be combined with a sudden drop in a measured pressure level below a level expected from normal use to detect a leak condition. In further embodiments, the analysis may comprise determining whether a signal from a water presence sensor indicates the presence of water outside the internal water supply system 106 and associated appliances and outlets.

In various embodiments, a baseline profile or set of one or more levels (e.g., pressure levels, water flow levels, or changes in levels) may be established or determined for the particular internal water pressure system 106. Such baseline levels may be determined based upon measured levels over an initial time interval, which may comprise weeks or months and may include information regarding timing of water use. In some embodiments, the baseline levels may be used to generate threshold levels indicative of leak conditions. Such baseline or threshold levels may be determined by application of machine learning models to the collected data to obtain thresholds specifically generated for the internal water supply system 106 that reflects typical use patterns for the specific building 102.

At block 408, when a leak condition has been detected, the method 400 continues to close the water shut-off valve 110 at block 410. In some embodiments, the controller 160 may cause a notification to be sent to a user to alert the user prior to closing the water shut-off valve 110 in order to enable the user to delay or prevent the shut-off action. For example, the controller 160 may send an alert message to a user device 312 via communication interface 166 in direct communication with the user device 132 or in indirect communication with the user device 132 via a smart home system 308 or a network 310, which alert message may prompt the user to intervene to prevent the shut-off operation within a predetermined time interval (e.g., five minute, two minute, or thirty seconds). If the user confirms the leak condition or does not respond within the predetermined time interval, the controller 160 then proceeds to close the water shut-off valve 110 at block 410. If the user sends a command from the user device 132 to the controller 160 to prevent closing the water shut-off valve 110, the controller 160 may clear the leak condition determination and prevent another leak condition from being determined during a reset time interval (e.g., one hour, twelve hours, or twenty-four hours). When the user thus prevents closing the water shut-off valve 110, the method 400 may proceed to block 414 as though no leak condition has been detected.

At block 410, the controller 160 controls the valve actuator 140 to close the water shut-off valve 110 by controlling operation of the motor 162. By operating the motor 162 to transfer a torque to the valve handle coupling 150 via the rotor 164, the controller 160 causes a torque to be applied to the handle 130 of the water shut-off valve 110 by the valve handle coupling 150 to close the water shut-off valve 110. The method 400 may then send a notification to a user before ending, or the method 400 may simply end.

At block 412, in some embodiments, the controller 160 further causes a notification to be sent to a user to alert the user to the water shut-off. Sending the notification may include sending a message to a user device 312 via communication interface 166 in direct communication with the user device 132 or in indirect communication with the user device 132 via a smart home system 308 or a network 310. Additionally or alternatively, sending the notification may include sending a notification to a hub of a smart home system 308, which hub may present the notification to the user.

The notification may alert the user to the water shut-off and may optionally include additional information, such as time of the shut-off or reason for the shut-off (e.g., likely leak detected, water dripping detected, or system test failed). In some embodiments, the user may be presented an option to override the water shut-off and cause the controller 160 to control the valve actuator 140 to open the water shut-off valve 110.

At block 408, when no leak condition has been detected, the method 400 continues to block 414. At block 414, the controller 160 determines whether one or more test conditions are met. Such test conditions may include the passage of time between periodic testing, determination of a likelihood of a leak based upon the water flow data or additional sensor data obtained from the sensors, or determination of another triggering condition for the test. For example, test conditions may be determined to be met when a water flow level is determined to be negligible during a time when water is not typically used in the internal water supply system 106, such as during the early morning, thus enabling testing without interruption of water usage. In some embodiments, the test conditions may include determining a power supply from a primary power source 180 has been disrupted, in which case testing may be performed using power from a battery 168 to determine whether to close the water shut-off valve 110 until primary power is restored (e.g., to prevent freezing of water in the pipes).

When the test conditions are determined not to be met at block 414, the method 400 continues with obtaining and analyzing additional sensor data, including water flow data at block 402 and additional sensor data at block 404. When the test conditions are determined to be met at block 414, the method 400 continues with performing a water system test at block 416. At block 416, the controller 160 performs a test of the internal water supply system 106 to determine whether to close the water shut-off valve 110 or send a user a notification.

The water system test may be performed as described below with respect to FIG. 5 in order to test the integrity of the internal water supply system 106, such as to determine whether maintenance should be performed or whether a slow leak may exist. In some embodiments, the water system test may determine whether a temperature level indicated by a temperature sensor is below a freeze risk threshold, such as when a power supply from a primary power source 180 has been disrupted. In such instances, the water shut-off valve 110 may be closed to reduce the risk of flooding due to frozen pipes. As discussed above, in some embodiments, the controller 160 may first send a notification to a user prior to closing the water shut-off valve 110 and may proceed to close the water shut-off valve 110 at block 410 only upon receiving a user confirmation or after receiving no user response during a predetermined time interval.

At block 418, the controller 160 determines whether the test results indicate the water system test has been passed (i.e., test passing criteria have been met or test failing criteria have not been met). In some embodiments, the results of the water system test may be stored or sent to a user for review. For example, a summary of the test results may be periodically sent to the user as a report of the overall health of the internal water supply system 106 on a weekly or monthly basis, which report may include recommendations regarding maintenance actions to perform. When the water system test is determined to have been passed, the method 400 continues with obtaining and analyzing additional sensor data, including water flow data at block 402 and additional sensor data at block 404. When the water system test is determined not to have been passed, the controller 160 may control the valve actuator 140 to close the water shut-off valve 110 at block 410 and optionally may send a notification to a user of the failed test at block 412 before ending the method 400.

Exemplary Water System Testing Method

Figure 5:
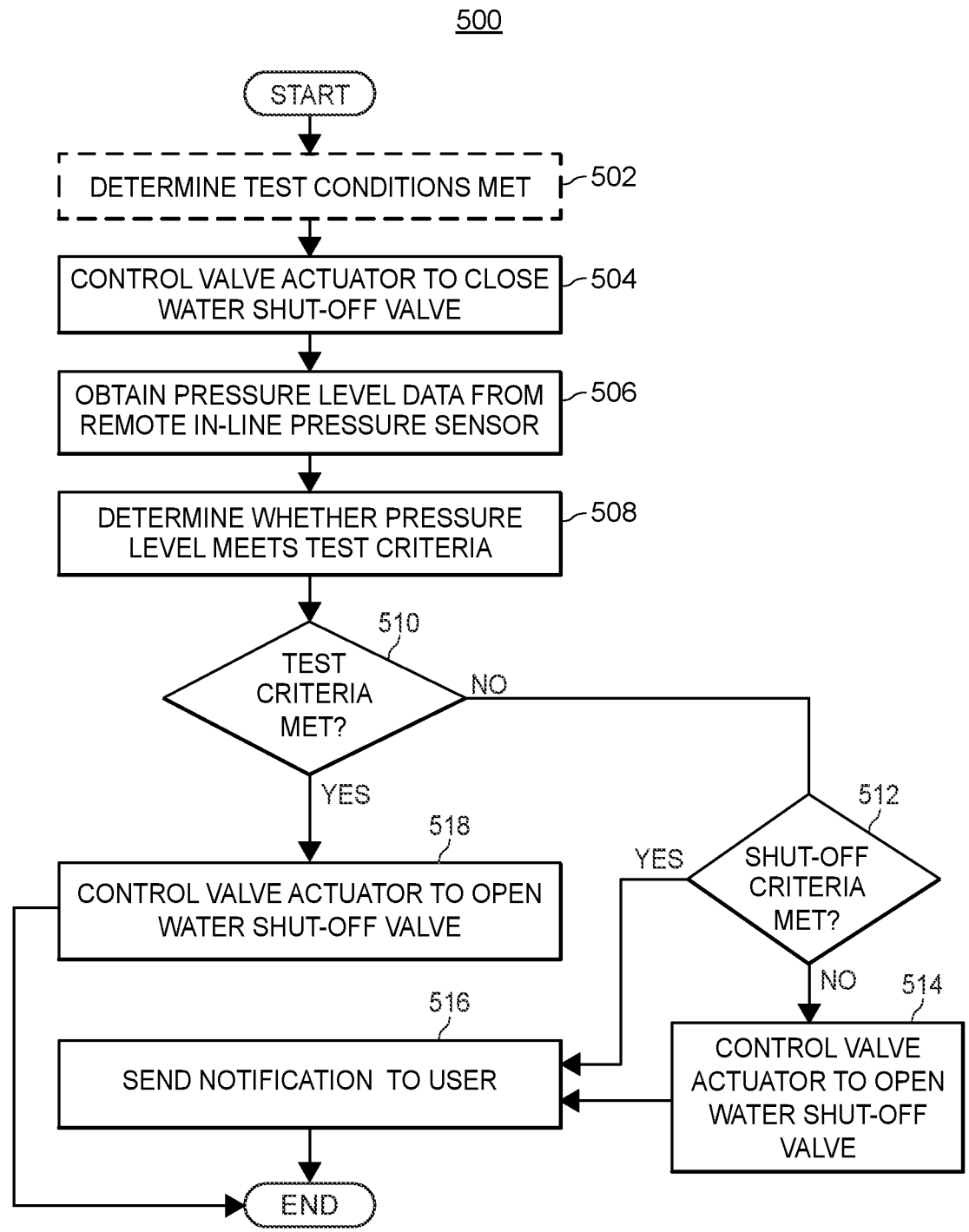
FIG. 5 illustrates a flow diagram of an exemplary water system testing method in accordance with various embodiments described herein.

FIG. 5 illustrates a flow diagram of an exemplary water system testing method 500 in accordance with various embodiments described herein. The method 500 may be performed by the various components of the automatic shut-off system 200 described above. Thus, one or more processors 302 of the controller 160 may be configured by executable instructions of one or more software applications stored in a memory 304 to perform a water system test for the internal water supply system 106 to determine a status of the internal water supply system 106 (e.g., by detecting slow leaks). In some embodiments, the controller 160 may communicate with a smart home system 308 or user device 312 to send and receive information relating to the internal water supply system 106, such as providing information indicating test results. The method 500 may be performed separately or may be implemented as part of the leak detection and water shut-off method 400 discussed above.

The water system testing method 500 may begin, in some embodiments, with determining certain test conditions have been met (block 502). Next, the controller 160 may begin the test by controlling the valve actuator 140 to close the water shut-off valve 110 (block 504) and obtains pressure level data from one or more remote sensors 172 (block 506). Using this pressure level data, the controller 160 may determine whether the measured pressure levels meet test criteria (block 508).

When the test criteria are met (block 510), the test is deemed passed, and the controller 160 causes the valve actuator 140 to open the water shut-off valve 110 (block 518) before ending the method 500. When the test criteria are not met (block 510), the controller 160 next determines whether shut-off criteria are met (block 512). When the shut-off criteria are met (block 512), the controller 160 leaves the water shut-off valve 110 closed and sends a notification to a user (block 516) before ending the method 500. When the shut-off criteria are not met (block 512), the controller 160 causes the valve actuator 140 to open the water shut-off valve 110 (block 514) before sending a notification to the user (block 516) before ending the method 500. Additional, fewer, or alternative actions may be included in various embodiments.

At block 502, in some embodiments, the controller 160 may determine one or more test conditions are met prior to performing a water system test for the internal water supply system 106. Since the test may be periodic, event-driven, or opportunistic, the test conditions may include the passage of time, detection of a triggering event (e.g., an atypical sudden change in pressure), or detection of favorable conditions after expiration of a delay from a previous test (e.g., no measurable water flow during overnight hours at least a day after the last test). For example, the test criteria may include detecting a measurement from a non-intrusive sensor 170 of a level of water flow through a pipe to which the non-intrusive sensor 170 is attached is below a testing threshold (e.g., is at or near zero flow) during a time window associated with periodic testing (e.g., between the hours of 2:00 AM and 4:00 AM).

In some embodiments, the test conditions or thresholds may be automatically generated by a machine learning algorithm using past water system usage or sensor data. In further embodiments, the controller 160 may select a water system test from among a plurality of water system tests based upon test conditions associated with each water system test. Once the test conditions are determined to be met, the controller 160 causes the automatic shut-off system 200 to perform the water system test.

At block 504, the controller 160 controls the valve actuator 140 to close the water shut-off valve 110, as discussed elsewhere herein. Closing the water shut-off valve 110 separates the internal water supply system 106 from the water supply 104 to enable testing. For example, the water supply 104 may mask the water pressure drop caused by slow leaks in the internal water supply system 106, so disconnecting the water supply 104 by closing the water shut-off valve 110 allows the test to detect leaks or other issues earlier and more accurately.

At block 506, the controller 160 obtains pressure level data from one or more remote sensors 172 comprising in-line water pressure sensors. The pressure level data comprises indications of water pressure within the internal water supply system 106 while the water shut-off valve 110 is closed. In some embodiments, the pressure level data is obtained for a testing window lasting for a duration of seconds or minutes in order to detect changes in pressure following the time at which the water shut-off valve 110 is closed.

In further embodiments, the controller 160 obtains or stores additional pressure level data measured immediately prior to the water shut-off valve 110 being closed. In still further embodiments, additional non-pressure data (e.g., vibration or acoustic data) may also be obtained from one or more remote sensors 172 as part of the water system test.

At block 508, the controller 160 analyzes the obtained pressure level data to determine whether the internal water supply system 106 passes the water system test. Analyzing the pressure level data may include determining whether the water pressure data meets test criteria of the water system test. Thus, one or more pressure levels indicated by the pressure level data (and, in some embodiments, the additional pressure level data) may be compared against one or more pressure thresholds specified by the test criteria. For example, the test criteria may require the measured pressure levels exceed a pressure threshold associated with a generally acceptable status of the internal water supply system 106, which may be a leak risk pressure threshold indicative of an elevated risk of a leak somewhere in the internal water supply system 106.

In some embodiments, the obtained sensor data may be compared against additional primary or secondary test criteria to determine whether the internal water supply system 106 passes the test or whether additional actions are needed. For example, the secondary test criteria may comprise shut-off criteria according to which the pressure levels may be compared to a shut-off pressure threshold lower than the leak risk pressure threshold in order to determine whether shut-off criteria are met, such that the water shut-off valve 110 may be reopened or left closed based upon the comparison.

In some embodiments, the pressure thresholds or other primary or secondary test criteria may be predetermined for the water system test. In further embodiments, the controller 160 may determine one or more pressure thresholds or other criteria based upon past data measured within the internal water supply system 106, such as determining pressure thresholds based upon a plurality of past pressure levels measured by remote sensors 172 comprising in-line pressure sensors installed within the internal water supply system 106. Such test criteria may be further determined based in part upon past water flow data measured by the non-intrusive sensor 170 or other sensors of the automatic shut-off system 200.

When the test criteria are determined to be met at block 510 (e.g., the one or more pressure levels exceed the pressure threshold indicated by the test criteria), the method 500 continues with opening the water shut-off valve 110 at block 518 before ending the method 500. At block 518, the controller 160 controls the valve actuator 140 to open the water shut-off valve 110 by operating the motor 162 to transfer a torque to the valve handle coupling 150 via the rotor 164, the controller 160 causes a torque to be applied to the handle 130 of the water shut-off valve 110 by the valve handle coupling 150 to open the water shut-off valve 110.

When the test criteria are determined not to be met at block 510, the controller 160 next determines whether the shut-off criteria are met at block 512. The shut-off criteria may be secondary criteria against which the obtained sensor data is compared to determine whether the risk of a significant leak in the internal water supply system 106 exceeds a threshold level for shutting off the water supply. Thus, determining whether the shut-off criteria are met may comprise determining whether one or more pressure levels in the obtained pressure level data fall below a minimum threshold level, where failure to meet or exceed the minimum threshold level indicates a high level of risk of a significant current leak in the internal water supply system 106.

When the shut-off criteria are determined to be met at block 512, the method 500 proceeds to sending a notification to a user at block 516, without opening the water shut-off valve 110. When the shut-off criteria are determined not to be met at block 512, however, the controller 160 first controls the valve actuator 140 to open the water shut-off valve 110 at block 514 before proceeding to send a notification to a user at block 516.

At block 516, the controller 160 sends a notification to a user regarding the failed water system test. Sending the notification may include sending a message to a user device 312 via communication interface 166 in direct communication with the user device 132 or in indirect communication with the user device 132 via a smart home system 308 or a network 310.

Additionally or alternatively, sending the notification may include sending a notification to a hub of a smart home system 308, which hub may present the notification to the user. The notification includes information regarding the failed water system test and may indicated recommended actions. If the shut-off criteria were determined not be have been met, the notification may include an alert notifying the user of the water shut-off and may optionally include additional information, such as time of the shut-off or reason for the shut-off. In some embodiments, the user may be presented an option to override the water shut-off and cause the controller 160 to control the valve actuator 140 to open the water shut-off valve 110. Upon sending the notification to the user, the method 500 ends.

ADDITIONAL CONSIDERATIONS

Throughout this specification, plural instances may implement components, operations, or structures described as a single instance. Although individual operations of one or more methods are illustrated and described as separate operations, one or more of the individual operations may be performed concurrently, and the operations may be performed in an order other than the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain aspects of the systems and methods described herein are directed to an improvement to computer functionality, and improve the functioning of conventional computers. Additionally, certain embodiments are described herein as including logic or a number of routines, subroutines, applications, or instructions. These may constitute either software (e.g., code embodied on a non-transitory, machine-readable medium) or hardware. In hardware, the routines, etc., are tangible units capable of performing certain operations and may be configured or arranged in a certain manner. In example embodiments, one or more computer systems (e.g., a standalone, client, or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" or "module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules include a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

It should also be understood that, unless a term is expressly defined in this patent using the sentence "As used herein, the term ' ' is hereby defined to mean . . . " or a similar sentence, there is no intent to limit the meaning of that term, either expressly or by implication, beyond its plain or ordinary meaning, and such term should not be interpreted to be limited in scope based upon any statement made in any section of this patent (other than the language of the claims). To the extent that any term recited in the claims at the end of this disclosure is referred to in this disclosure in a manner consistent with a single meaning, that is done for sake of clarity only so as to not confuse the reader, and it is not intended that such claim term be limited, by implication or otherwise, to that single meaning.

Unless specifically stated otherwise, discussions herein using words such as "processing." "computing," "calculating," "determining." "presenting." "displaying." or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still cooperate or interact with each other. The embodiments are not limited in this context.

As used herein, the terms "comprises." "comprising." "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also may include the plural unless it is obvious that it is meant otherwise.

This detailed description is to be construed as examples and does not describe every possible embodiment, as describing every possible embodiment would be impractical, if not impossible. One could implement numerous alternate embodiments, using either current technology or technology developed after the filing date of this application.

Upon reading this disclosure, those of skill in the art will appreciate still additional alternative structural and functional designs for evaluation properties, through the principles disclosed herein. Therefore, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

The patent claims at the end of this patent application are not intended to be construed under 35 U.S.C. § 112(f) unless traditional means-plus-function language is expressly recited, such as "means for" or "step for" language being explicitly recited in the claim(s). The systems and methods described herein are directed to an improvement to computer functionality, and improve the functioning of conventional computers.

What is claimed is:

1. A system for actuating a water shut-off valve attached to a pipe of a water supply system, comprising:
   a valve actuator comprising a motor and a valve handle coupling configured to apply a torque to a handle of the water shut-off valve to selectively open or close the water shut-off valve to control flow of water through the pipe;
   a non-intrusive flow sensor configured to sense water flow within the pipe when attached to an external surface of the pipe;
   a communication interface configured to send and receive electronic communication via one or more wireless communication protocols; and
   a controller communicatively connected to the valve actuator, the non-intrusive flow sensor, and the communication interface, wherein the controller is configured to execute instructions to:
   obtain water flow data indicating a level of water flow through the pipe from the non-intrusive flow sensor;
   obtain additional sensor data from one or more remote sensors disposed at one or more additional pipes within the water supply system via the communication interface, wherein the one or more remote sensors include an in-line pressure sensor disposed between a terminal connection of one of the one or more additional pipes and a supply hose of a faucet or appliance;
   determine whether a leak condition is detected within the water supply system based upon the water flow data and the additional sensor data; and
   when the leak condition is detected, control the valve actuator to close the water shut-off valve.

2. The system of claim 1, wherein the non-intrusive flow sensor is an ultrasonic flow sensor configured to be clamped onto the pipe.

3. The system of claim 1, wherein the non-intrusive flow sensor is disposed in proximity to the water shut-off valve and is communicatively connected to the controller via a wired connection.

4. The system of claim 1, further comprising an actuator clamp attached to the valve actuator and configured to hold the actuator in position relative to the shut-off valve, wherein the actuator clamp is configured to fasten around the pipe in proximity to the shut-off valve and wherein the non-intrusive flow sensor is attached to or integrated into the actuator clamp.

5. The system of claim 1, wherein:
the additional sensor data includes a pressure level measured by the in-line pressure sensor; and
determining whether the leak condition is detected comprises determining whether the pressure level is below a pressure threshold.

6. The system of claim 1, wherein:
the additional sensor data includes a pressure level measured by the in-line pressure sensor; and
the controller is further configured to execute instructions to:
periodically control the valve actuator to close the water shut-off valve at times when the level of water flow through the pipe is below a testing threshold;
obtain the pressure level from the in-line pressure sensor while the water shut-off valve is closed;
determine the pressure level exceeds a pressure threshold; and
control the valve actuator to reopen the water shut-off valve based upon the pressure level exceeding the pressure threshold.

7. The system of claim 6, wherein the controller is further configured to execute instructions to:
determine whether the pressure level exceeds a leak risk pressure, wherein the leak risk pressure is greater than the pressure threshold; and
when the pressure level does not exceed the leak risk pressure, send a notification via the communication interface to cause an alert to be presented to a user via a user computing device.

8. The system of claim 1, wherein the one or more remote sensors include one or more water presence sensors disposed below the one or more additional pipes to detect leaks based upon water presence outside the one or more additional pipes.

9. The system of claim 1, wherein:
the communication interface is configured to communicate with a smart home hub; and
the controller is further configured to execute instructions to, when the leak condition is detected, send a notification to the smart home hub in order to cause the smart home hub to present an alert to a user via a user computing device.

10. The system of claim 1, wherein the handle of the water shut-off valve comprises a lever handle of a ball valve.

11. The system of claim 1, wherein the handle of the water shut-off valve comprises a handwheel of a gate valve.

12. The system of claim 1, further comprising:
an external battery backup connected to the valve actuator via a power cable; and
a temperature sensor communicatively connected to the controller,
wherein the controller is further configured to execute instructions to, when a power supply from a primary power source has been disrupted:
determine whether a temperature indicated by the temperature sensor is below a freeze risk threshold; and
when the temperature is below the freeze risk threshold, control the valve actuator to close the water shut-off valve.

13. A computer-implemented method for actuating a water shut-off valve attached to a pipe of a water supply system, comprising:
obtaining, by one or more processors of a controller, water flow data indicating a level of water flow through the pipe from a non-intrusive flow sensor, wherein non-intrusive flow sensor is configured to sense water flow within the pipe when attached to an external surface of the pipe;
obtaining, by the one or more processors, additional sensor data from one or more remote sensors disposed at one or more additional pipes within the water supply system via a communication interface via a communication interface configured to send and receive electronic communication via one or more wireless communication protocols, wherein the one or more remote sensors include an in-line pressure sensor disposed between a terminal connection of one of the one or more additional pipes and a supply hose of a faucet or appliance;
determining, by the one or more processors, whether a leak condition is detected within the water supply system based upon the water flow data and the additional sensor data; and
when the leak condition is detected, controlling, by the one or more processors, a valve actuator to close the water shut-off valve, wherein the valve actuator comprises a motor and a valve handle coupling configured to apply a torque to a handle of the water shut-off valve to selectively open or close the water shut-off valve to control flow of water through the pipe.

14. The computer-implemented method of claim 13, wherein the non-intrusive flow sensor is an ultrasonic flow sensor configured to be clamped onto the pipe.

15. The computer-implemented method of claim 13, wherein:
the additional sensor data includes a pressure level measured by the in-line pressure sensor; and
determining whether the leak condition is detected comprises determining whether the pressure level is below a pressure threshold.

16. The computer-implemented method of claim 13, further comprising performing, by the one or more processors, periodic testing of the water supply system by:
controlling the valve actuator to close the water shut-off valve at times when the level of water flow through the pipe is below a testing threshold;
obtaining a pressure level from the in-line pressure sensor while the water shut-off valve is closed;
determining the pressure level exceeds a pressure threshold; and
controlling the valve actuator to reopen the water shut-off valve based upon the pressure level exceeding the pressure threshold.

17. The computer-implemented method of claim 16, further comprising:
determining, by the one or more processors, the pressure threshold based upon a plurality of past pressure levels measured by the in-line pressure sensor, wherein each past pressure level is associated with a respective past level of water flow through the pipe.

18. The computer-implemented method of claim 13, wherein:
the one or more remote sensors include one or more water presence sensors disposed below the one or more additional pipes to detect leaks based upon water presence outside the one or more additional pipes; and
determining whether the leak condition is detected comprises determining whether water is detected by at least one of the one or more water presence sensors.

19. The computer-implemented method of claim 13, further comprising:
when the leak condition is detected, sending, by the one or more processors via the communication interface, a notification to a smart home hub in order to cause the smart home hub to present an alert to a user via a user computing device.

20. The computer-implemented method of claim 13, further comprising:
determining, by the one or more processors, a power supply from a primary power source has been disrupted;
determining, by the one or more processors, a temperature level indicated by a temperature sensor communicatively connected to the controller is below a freeze risk threshold; and
controlling, by the one or more processors, the valve actuator to close the water shut-off valve.

* * * * *